United States Patent [19]

Noble

[11] 3,974,890
[45] Aug. 17, 1976

[54] SNOWMOBILE SUSPENSION
[76] Inventor: James Noble, P.O. Box 2532, Idaho Falls, Idaho 83401
[22] Filed: May 8, 1975
[21] Appl. No.: 575,497

[52] U.S. Cl. .................................. 180/5 R; 305/24
[51] Int. Cl.² .......................................... B62D 57/02
[58] Field of Search ................. 180/5 R, 9.46, 9.48, 180/9.5, 9.2 R; 305/24, 10, 30, 6

[56] References Cited
UNITED STATES PATENTS

| | | | |
|---|---|---|---|
| 3,156,505 | 11/1964 | Hubert | 305/30 |
| 3,494,438 | 2/1970 | Rose | 305/30 |
| 3,690,394 | 9/1972 | Skime | 305/24 |
| 3,893,526 | 7/1975 | Esch | 180/5 R |

Primary Examiner—Philip Goodman
Attorney, Agent, or Firm—Trask & Britt

[57] ABSTRACT

An improved snowmobile suspension system to facilitate fast cornering is described. The improved suspension system comprises throttle-independent tilt means to remove at least a portion of the forward part of the tread of the snowmobile to support said snowmobile on the front guide skis and the rear of the track propulsion system. A particularly useful device comprises lift means which lifts the forward part of the track. Pneumatic or hydraulic means are preferred lift means and may be actuated from a reservoir of high pressure fluid.

13 Claims, 4 Drawing Figures

3,974,890

SNOWMOBILE SUSPENSION

BACKGROUND OF THE INVENTION

1. Field

Snowmobiles have lengthy endless tracks to provide superior traction on snow. A pair of ski-like guides are provided at the front of the snowmobile to provide steering means. Snowmobile racing machines have long tracks with a rail-suspension system to provide maximum traction.

2. Prior Art

Snowmobiles have a slide rail suspension system to provide maximum traction, especially snowmobiles used in racing competition. Recreational snowmobiles frequently have rollers supporting the tread. Maintaining maximum traction between the track and the snow requires a flat track support and a stiff suspension system.

Snowmobile racing frequently involves racing upon an oval course where speed through tight corners is very desirable. The long, flat track provides excellent traction, but tends to drive the snowmobile in a straight line, even in corners, therefore requiring that corners to be negotiated at slow speeds.

A typical snowmobile slide-rail suspension system illustrated in U.S. Pat. No. 3,485,312 of Swenson et al.

OBJECTS OF THE INVENTION

It is an object of the instant invention to provide a snowmobile of superior cornering ability independent of engine speed or engine torque.

A further object of the instant invention is to provide a snowmobile suspension system wherein the angle of the track to the terrain can be adjusted.

Another object of the invention is to provide a snowmobile suspension system which can assume alternatively a maximum traction position and a cornering position.

A further object of the instant invention is to provide a snowmobile suspension system which can substantially instantaneously assume a cornering position.

SUMMARY OF THE INVENTION

A unique snowmobile suspension for providing superior cornering ability comprises throttle-independent tilt means to remove the forward portion of the track from contact with the snow, providing essentially two-point contact with the terrain, i.e., the skis and the rear of the track. The tilt means functions to (1) lift the forward portion of the snowmobile, (2) depress the rear portion of the track or (3) raise the forward portion of the track. The latter technique is generally preferred inasmuch as the center of gravity is not elevated, which is particularly desirable on a racing snowmobile. The lift means may be a mechanical system although a pneumatic or hydraulic system is preferred to provide instantaneous response without any substantial effort on the part of the driver and without being dependent upon engine speed or engine torque.

A preferred system comprises a hydraulic or pneumatic cylinder located between the upper and lower tracks which communicates with a reservoir of high pressure fluid. The high pressure fluid is introduced into the cylinder to drive the piston therein to a position which, through intermediate connections to the snowmobile frame and suspension system, places an upward force on the suspension system.

DESCRIPTION OF THE DRAWINGS

The instant invention is illustrated in its preferred embodiments by the following figures wherein.

DESCRIPTION OF THE INVENTION

Figure 1:
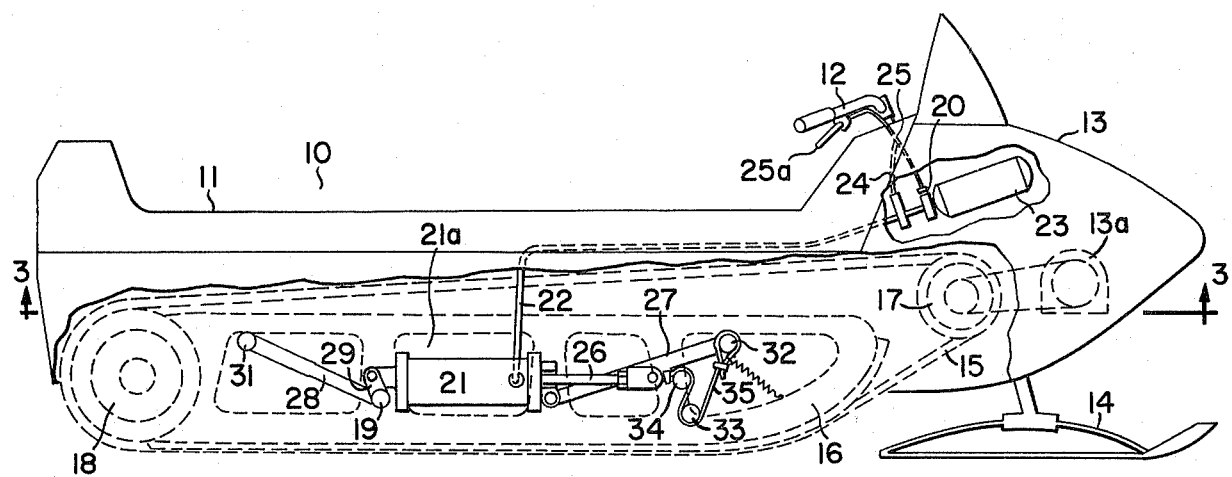
FIG. 1 is an elevational view of a snowmobile with a cut-out area illustrating the novel suspension system.

A snowmobile 10 is illustrated in FIG. 1 having a seat portion 11, a handle bar 12 for steering, a cowl or hood 13 covering the forward portion of the snowmobile and skis 14 which are interconnected with the handle bar to provide steering means for the snowmobile. A track or tread 15 provides the traction to propel the snowmobile across snow and ice surfaces. The track 15 is an endless belt which travels about power driven pulley 17 and fixed pulley 18. The tread travels around a track frame 16 which maintains the track in a flat condition in contact with the terrain.

The track frame 16 is suspended from the snowmobile frame by a pair of torsion bars 27 and 28. One end of the torsion bars, preferably the lower end, is connected to the track frame 16 while the upper end is connected to the snowmobile frame. The point of connection of at least the forward torsion arm is above and forward of the connection of the torsion bar to the track frame to provide the track frame with an upward and rearward movement as the track frame is pushed upwards in riding over a hump or uneven surface. The rearward direction of the track frame during the elevation of the track frame is preferred to maintain proper tension on the tread 15.

Track tension may also be maintained by idler wheels installed in the upper part of the track frame. As the track frame is raised the idler wheels push against the track holding the track at proper tension.

The method of suspending the track frame from the snowmobile frame is a conventional method of suspending the track frame from the snowmobile frame to provide means for absorbing bumps and shock to the snowmobile track frame. Other spring means to suspend the track frame from the snowmobile frame may be utilized. The system illustrated in FIG. 1 is unique in that the operator of the snowmobile may elevate the forward portion of the track frame manually so that the snowmobile has contact with the terrain upon the rear portion of the tread and upon the skis. A piston contained within a cylinder 21 is interconnected through a line 22 to a pneumatic or hydraulic storage cylinder 23 containing high pressure gas or high pressure liquid. The high pressure fluid passes through a regulator 20 which regulates the pressure of the fluid conveyed to power cylinder 21. The storage cylinder, particularly in a pneumatic system, holds fluid having pressures of 2,000 psi or greater, while an operating pressure for power cylinder 21 is preferably about 100 to 200 psi. Valve 24 is connected through cable 25 to handle means 25a so that the operator by depressing handle 25a can move valve 24 to the activate position so that high pressure fluid passes from storage cylinder 23, through regulator 20 into power cylinder 21 to retract piston and piston arm 26. In a rest or relaxed position the valve 24 communicates with line 22 to exhaust cylinder 21 to the atmosphere if a pneumatic system is used or to a low pressure or atmospheric reservoir if a hydraulic system is utilized. A vent 21a is provided in cylinder 21 to vent air from behind the piston whenever high pressure fluid is being applied to the piston. The piston may be spring loaded to return the piston to a rest position, although the weight of the track frame in FIG. 1 will perform that function.

Cylinder 21 is anchored to the track frame by the coupling 29 which attaches through pin 19 to the track frame. Torsion bar 28 connects pin 19 to pin 31 which is anchored to the snowmobile frame. The forward portion of the cylinder is anchored to the track frame by pin 30 which is connected through torsion bar 27 to pin 32 which is fastened to the snowmobile frame. Cylinder arm 26 attaches to a cable 35 which is anchored at one end to pin 32 and at the other end to piston arm 26 after passing below pin 33 and over pin 34. Pins 33 and 34 are both connected to the track frame. As the piston within cylinder 21 is driven to the rear, piston arm 26 moves to the rear thus putting a significant tension on cable 35 and lifting pin 33 to a closely adjacent position to pin 32 which is attached to the snowmobile frame.

Figure 2:
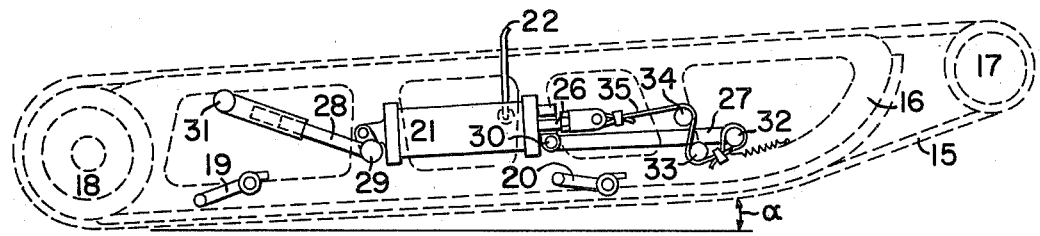
FIG. 2 is an elevational view of the novel snowmobile suspension in an elevated position.

The illustration of FIG. 2 depicts the track frame and tread in an elevated position. The bottom of the tread and track frame is disposed at an angle alpha with relation to a horizontal surface. The angle alpha is generally from about 2 to about 10° and preferably from about 3 to about 8°. For a typical track having a contact surface of about 3 to about 4 feet, an elevation of 2 to 5 inches, preferably at least 3 inches, of the forward portion of the track is sufficient to remove most of the track surface from contact with the terrain and thereby permit substantially two-point contact between the rear of the track and the skis. Piston arm 26 of cylinder 21 is shown in a retracted position so that the tension on cable 35 has pulled pin 30 substantially adjacent to pin 32. As can be seen from FIG. 2, torsion arm 27 has stayed the same length, thus the horizontal distance between pin 30 and pin 32 has been increased which has caused the track frame 16 to move slightly to the rear, thereby maintaining proper tension on the endless track. Pin 32 is attached to the snowmobile frame so that as pin 30 revolved upward about pin 32 it has moved to the rear and has thus moved the track frame to the rear as well. The moving of the track frame to the rear has caused torsion arm 28 to shorten.

Figure 3:
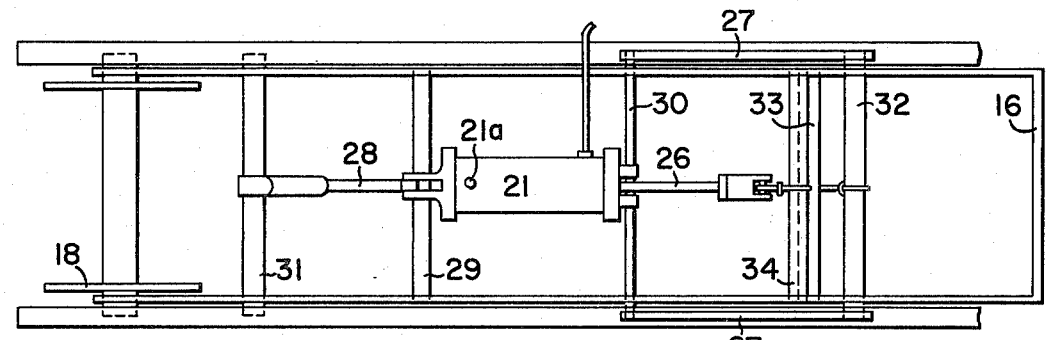
FIG. 3 is a plan view along section lines 3—3 of FIG. 1.

FIG. 3 is a plan view along section lines 3—3 of FIG. 1 which illustrates the pin arrangement and the mounting of a single cylinder 21 within the track frame 16. It is recognized, of course, that a pair of power cylinders can be effectively utilized with a cylinder located on opposite, outboard sides of the track frame. A single, centrally located power cylinder is preferred, however, since dual cylinders must work substantially simultaneously to preclude binding. Cylinder 21 is anchored to the track frame by pins 29 and 30 which extend transversely between the upright members of the track frame to centrally suspend the cylinder 21. Pins 31 and 32 pass through openings in the track frame and are secured to the snowmobile frame. Rods 27 are disposed on each side of the track frame and interconnect pins 30 and 32. Rod 28 extends between anchored pins 31 and the track frame pin 29. Rod 28 tends to stabilize the movement of the frame.

Figure 4:
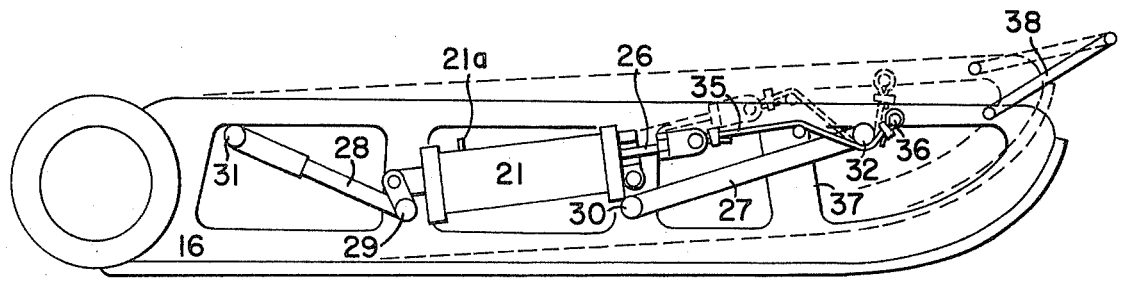
FIG. 4 is an elevation view illustrating an embodiment wherein the snowmobile suspension unit is in a normally elevated position.

Alternate means of suspending the track frame from the snowmobile frame to facilitate cornering of a snowmobile is illustrated in FIG. 4 wherein the track frame is in an elevated position while in a relaxed or rest position.

Torsion bar 38 which is affixed at one end to the snowmobile frame and to the other end to the track frame maintains a track frame in an elevated position. This may also be accomplished by having excess torsion on torsion bars 27 and 28. The retraction of arm 26 into cylinder 21 places a tension on the cable 35 and pulls pin 36 which is attached to the track frame down to a position substantially adjacent pin 32 which is attached to the snowmobile frame. The cable 35 rides over pin 37 which is attached to the track frame. Thus, the actuation of high pressure fluid into cylinder 21 causes the track frame to move into a lower position to have full contact between the tread and the terrain. The arrangement illustrated in FIG. 4 is advantageous for use on a course having a great number of turns and very few and very short straightaways.

The cylinder 21 and cable 35 may be reversed in an arrangement similar to FIG. 4 so that the rear portion of the track frame is depressed while the forward portion retains its normal position, thus providing substantially two-point contact between the rear of the track and the skis. Alternatively, a double-acting cylinder or a pair of cylinders may be utilized to lift the front and simultaneously depress the rear of the track frame. Such a dual action has some advantages inasmuch as length of piston travel is reduced and the vertical travel of the forward portion of the track reduced. As indicated above, a system in which the forward portion of the track is lifted is preferred inasmuch as it does not raise the center of gravity of the snowmobile.

The storage cylinder or reservoir for high pressure fluid may be one which is initially charged, especially if a high pressure gas is used, and gradually discharged during a race with a new or recharged cylinder inserted for the next race. Alternatively, a compressor may be connected to the snowmobile engine so that the high pressure storage cylinder may be continuously or intermittently recharged during a race. In a fluid recharging system, preferred technique is to have the compressor fitted with a clutch and activated only during the cornering of the snowmobile so that no engine power is lost during acceleration of the snowmobile in straightaways.

The use of a hydraulic system will generally require either an ancillary pneumatic system in which to pressurize the hydraulic fluid or a compressor to fill a cylinder with a spring-loaded piston so that hydraulic fluid of a desired pressure is always readily available. It is generally desired that the actuation of the system to tilt the snowmobile frame act rapidly, thus it is desired to have a cylinder of high pressure fluid available for immediate release into the power cylinder which tilts the track frame. Pumping of hydraulic fluid from a compressor directly into the power cylinder is generally not preferred inasmuch as the transfer of high pressure fluid is not rapid enough. Thus, if a hydraulic compressor is utilized it is preferred to pump high pressure hydraulic fluid into an accumulator where it is maintained under extremely high pressure.

Although a high pressure fluid system is preferred, the track frame may be tilted mechanically through a pulley or lever system giving a multiple mechanical advantage so that the driver may depress a long lever to tilt the frame. Although through the use of a lever or pulley system having a high mechanical advantage, a driver can manually exert sufficient force to tilt the snowmobile frame, it is preferred that the snowmobile frame be tiltable without any substantial exertion on the part of the driver inasmuch as the snowmobile is traveling at a very high rate of speed and the distribution of the driver's weight is important. Also, any act which requires exerting of large force by the driver may cause loss of control of the machine. Alternatively, the cable system may be utilized and extended through a series of pulleys to give an increased mechanical advantage and then fastened to the drum of a power driven winch, which may be interconnected to the snowmobile engine through a speed reduction gear box. The winch may be connected by clutch and lock mechanism so that when the winch is activated it rapidly takes up the cable and quickly tilts the track frame. As the track frame reaches its extreme elevated position the clutch can release and a lock mechanism maintain the winch in place until the snowmobile operator releases same. This technique puts a drag on the engine as the snowmobile is coming into a turn but because of the flywheel effect of the engine and the rapidly moving track and associated pulleys, the effect upon the speed control of the snowmobile is minimal. Thus, by gear reduction, a motor driven winch may be utilized to tilt the track frame regardless of engine speed or engine torque.

Lift means utilizing a pneumatic system is preferred in the practice of this invention inasmuch as the lift means can be entirely independent of the snowmobile engine and the power cylinder may act as a shock absorber even when filled with moderately high pressure gas. Furthermore, a pneumatic system is particularly simple in construction, has a high degree of reliability and is fast-acting.

I claim:
1. A snowmobile having improved turning capability comprising:
  a. a snowmobile frame having a power plant, drive sprocket and ski guide means attached thereto;
  b. a track frame suspended from said snowmobile frame;
  c. an endless track encircling said drive sprocket and said track frame;
  d. driver operable tilt means to tilt said track frame to remove the forward part of the track beneath said track frame from contact with the terrain while said snowmobile is in motion; and
  e. throttle-independent actuator means to actuate said tilt means.
2. The snowmobile of claim 1 wherein said track frame is an elongated frame having a substantially flat bottom surface, a curved forward surface and a rear idler pulley.
3. The snowmobile of claim 1 wherein said tilt means is powered by a high pressure fluid.
4. The snowmobile of claim 3 wherein said tilt means comprises a piston within a power cylinder wherein said cylinder is anchored to said track frame and said piston is interconnected to said snowmobile frame.
5. The snowmobile of claim 1 wherein said tilt means elevates the forward portion of the track frame.
6. The snowmobile of claim 1 wherein said tilt means depresses the rear portion of the track frame.
7. The snowmobile of claim 5 wherein said tilt means displaces said track means slightly to the rear of the snowmobile frame.
8. The snowmobile of claim 4 wherein said tilt means elevates the forward portion of the track frame.
9. The snowmobile of claim 8 wherein said drive cylinder is interconnected to a high pressure fluid reservoir through valve means.
10. The snowmobile of claim 9 wherein said valve means is manually actuated.
11. The snowmobile of claim 1 wherein said tilt means is powered by winch means interconnected to said snowmobile power plant.
12. The snowmobile of claim 8 wherein said piston is anchored to said snowmobile frame through cable means which passes about a pin attached to the forward portion of said track frame to change the elevation of said pin upon tensioning of said cable through movement of said piston.
13. The snowmobile of claim 1 wherein said tilt means comprises:
  a. a source of high pressure fluid;
  b. a driver operable valve to allow passage of said high pressure fluid to a cylinder and piston wherein said cylinder and piston are interconnected to the snowmobile frame and to the track frame to change the elevaton of a portion of the track frame in relation to the snowmobile frame upon discharge of high pressure fluid from the high pressure fluid source into said cylinder.

* * * * *